Nov. 18, 1958
H. EGLI
2,860,827
TURBOSUPERCHARGER
Filed June 8, 1953
3 Sheets-Sheet 1
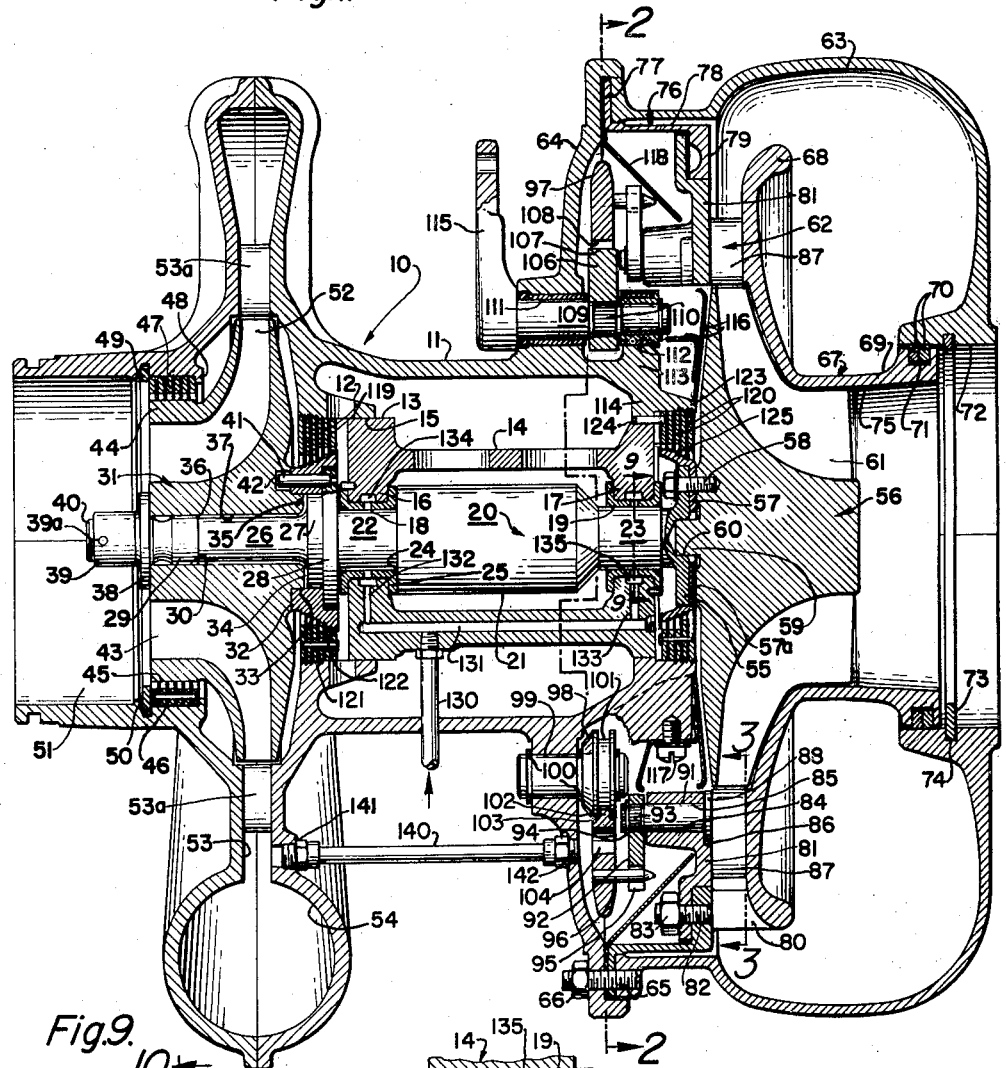
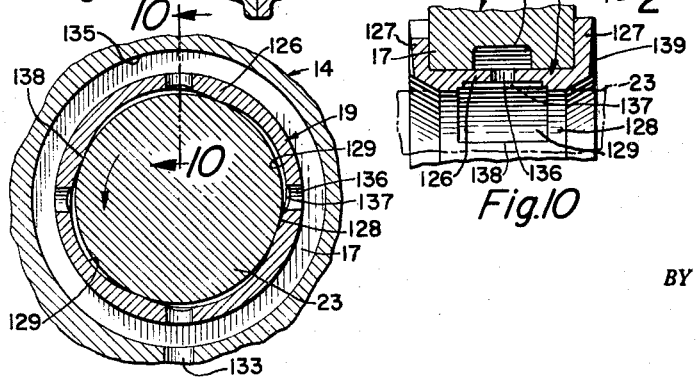
HANS EGLI,
INVENTOR.
BY John H.G. Wallace Nov. 18, 1958
H. EGLI
2,860,827
TURBOSUPERCHARGER
Filed June 8, 1953
3 Sheets-Sheet 2
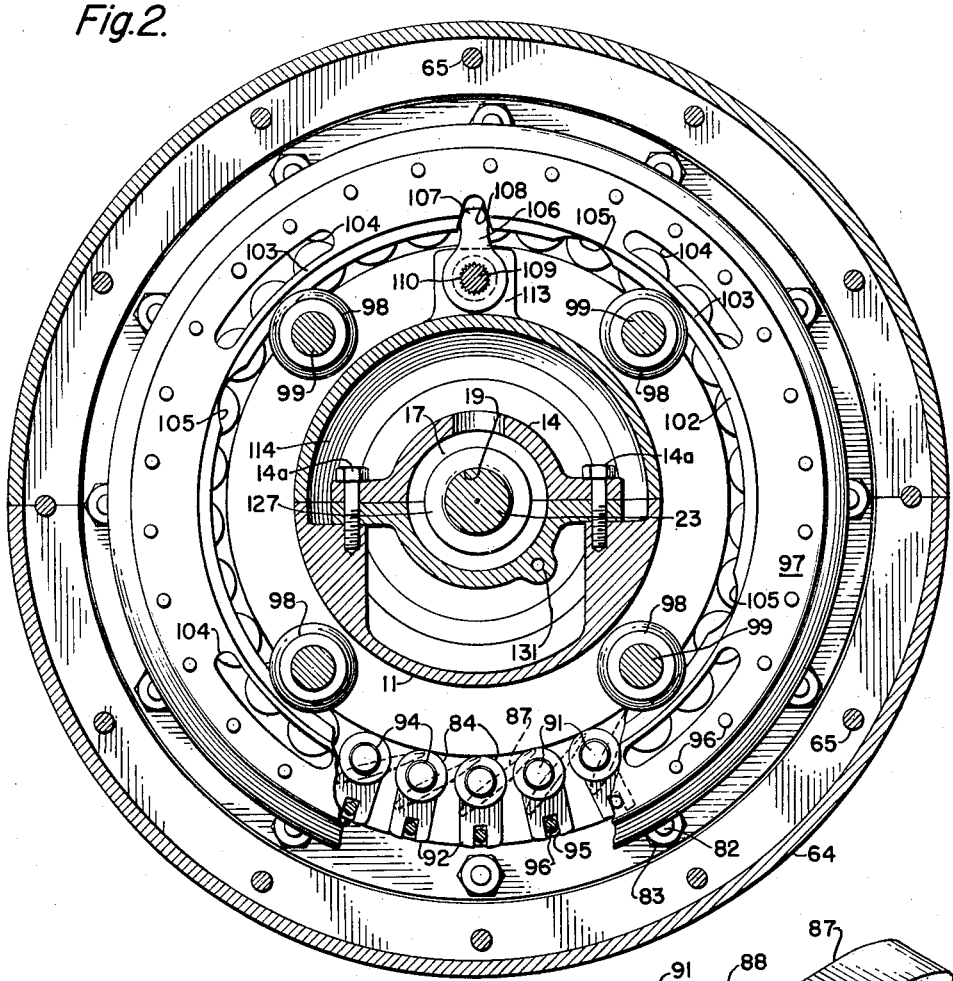
Fig.2.
Fig.3.
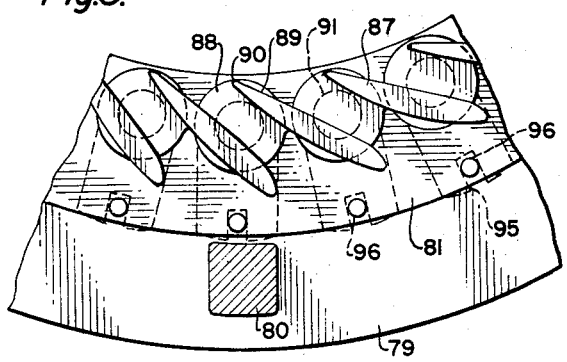
Fig.4.
HANS EGLI,
INVENTOR.
BY John H. J. Wallace

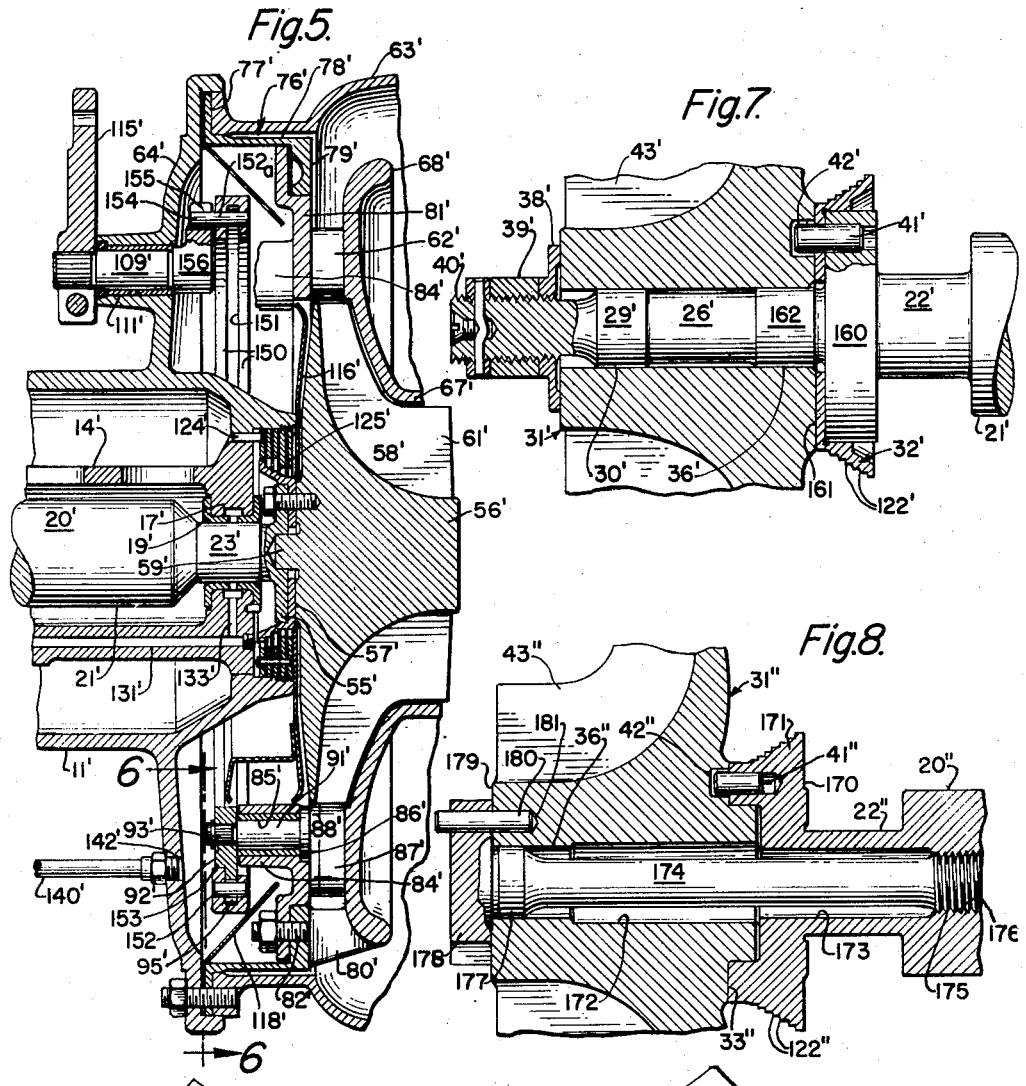
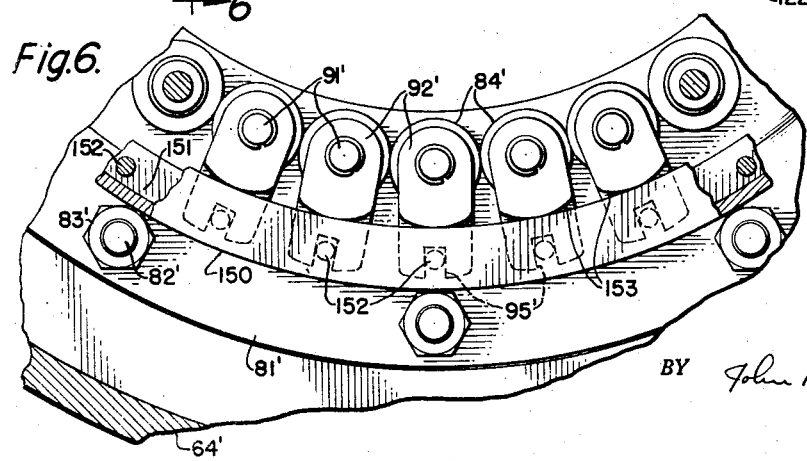

United States Patent Office 2,860,827
Patented Nov. 18, 1958

2,860,827

TURBOSUPERCHARGER

Hans Egli, Santa Monica, Calif., assignor to The Garrett Corporation, Los Angeles, Calif., a corporation of California Application June 8, 1953, Serial No. 360,263

28 Claims. (Cl. 230—116)

This invention relates to turbosupercharging apparatus and more particularly to a turbosupercharger of the type employing an engine exhaust-driven turbine and a centrifugal compressor.

While not specifically limited thereto, the device of the present invention is primarily intended for supplying combustion air at high pressure and density to an internal combustion reciprocating engine.

It is an object of the invention to provide novel unitary engine supercharging apparatus of the type described.

Another object of the invention is to provide engine supercharging apparatus having a novel variable area nozzle structure.

A further object of the invention is to provide a novel flexible mounting arrangement for a turbosupercharger nozzle ring to permit expansion and contraction of the structure due to temperature changes.

Another object of the invention is to provide a novel variable area nozzle actuating mechanism for a turbosupercharger.

A still further object of the invention is to provide an improved variable area nozzle vane construction.

Still a further object of the invention is to provide novel sealing means intermediate the compressor and the turbine rotor of an engine supercharger or the like.

Another object of the invention is to provide a novel rotor mounting structure to maintain concentricity between the said rotor and a shaft, and to allow for expansion or contraction of the rotor due to temperature changes.

A still further object of the invention is to provide a novel bearing structure for a shaft, and lubrication means therefor, whereby the movement of a lubricant through said bearing structure will be accomplished by pumping means inherent in the construction thereof.

Another object of the invention is to provide novel means for cleansing the area intermediate relatively moving components of a variable area nozzle vane arrangement.

Other and further important objects of the invention will become apparent in the disclosures in the following detailed description, appended claims, and accompanying drawings wherein:

Fig. 1 is a longitudinal sectional view showing the unitary turbosupercharger of the present invention;

Fig. 2 is a transverse sectional view taken substantially as indicated by line 2—2, Fig. 1, showing the variable area nozzle of the present invention and actuating means therefor;

Fig. 3 is an enlarged fragmentary sectional view taken substantially as indicated by line 3—3, Fig. 1, and showing a portion of the nozzle vane construction of the present invention;

Fig. 4 is an enlarged fragmentary perspective view of one of the nozzle vanes and support means therefor;

Fig. 5 is a fragmentary longitudinal sectional view, similar to a portion of Fig. 1, and showing a modified form of variable area nozzle vane actuating mechanism;

Fig. 6 is an enlarged fragmentary sectional view of the modified variable area nozzle vane of Fig. 5, and taken substantially as indicated by line 6—6 in Fig. 5;

Fig. 7 is a fragmentary sectional view showing a modified form of rotor mounting means;

Fig. 8 is a fragmentary sectional view similar to Fig. 7, and showing a further modified form of rotor mounting;

Fig. 9 is an enlarged detail sectional view of the bearing arrangement in the present invention, and taken substantially as indicated by line 9—9, Fig. 1; and Fig. 10 is a fragmentary sectional view through the bearing of Fig. 9, and taken substantially as indicated by line 10—10, Fig. 9.

Referring to the drawings, the present invention is embodied in an engine turbosupercharger indicated generally at 10. The device includes a housing 11 which may be split longitudinally for assembly purposes. The housing has an inwardly directed web portion 12 having an integrally formed inwardly extending tapered boss or ring 13, the ring 13 being adapted to support a split bearing carrier 14 by contact therewith along an inwardly directed surface 15. The bearing carrier 14 is secured to the housing by bolts 14a (Fig. 2) arranged in suitable elongated openings permitting axial positioning of the bearing carrier and associated bearings. The bearing carrier 14 has radially inwardly directed portions 16 and 17 which support bearings indicated generally at 18 and 19 respectively.

A shaft 20, adapted to be rotatably supported by the bearings 18 and 19, has an enlarged central portion 21 and reduced diameter portions 22 and 23, the portions 22 and 23 being journaled in the bearings 18 and 19, respectively. A shoulder 24 formed on the enlarged portion 21, adjacent the portion 22, is adapted to engage one of the side portions 25 of the bearing 18 for thrust loading.

An extension shaft 26 is formed on one end of the shaft portion 22, there being a plurality of flanges 27 and 28, formed intermediate the portion 22 and the extension 26. The extension 26 has an enlarged land 29 formed adjacent the outer end thereof, which is adapted to engage a bore 30 formed in a radial outward flow or centrifugal compressor wheel 31. A compound mounting and sealing ring 32, of material substantially stronger than that of the wheel 31 is positioned about the flanges 27 and 28, and extends axially for engagement with the wheel 31 through an annular recessed face 33 formed on the wheel and spaced from the axis thereof. The construction of the mounting arrangement for the wheel 31 is such that a clearance space 34 is formed intermediate the axial end 35 of the wheel and the shaft flange 27.

The compressor wheel bore 30 is relieved as at 36, to provide a space 37 intermediate the shaft extension 26 and the hub of the wheel so that, when assembled and operating, the ring 32, in conjunction with shaft land 29, will maintain the wheel 31 in concentric alignment on the shaft extension 26 due to centrifugal force causing a compressive effect on the portion of the ring 32 engaging the radial outer surface of the recessed face 33. The relatively short axial length of contact between the land 29 and the bore 30 serves to pilot the wheel and support it should it become inadvertently loosened from its normal position. The wheel 31 is retained against the shaft flange 27 by means of the ring 32, a washer 38, which engages the outer hub face of the wheel, and a nut 39, threaded on the outer end 40 of the shaft extension 26. A pin 39a serves to lock the nut 39 on the end 40 of the shaft extension 26. A shear pin 41 extends partially through the flange 28, through the ring 32 and into a recessed opening 42 formed in the wheel 31. The pin 41 also acts for a limited time as a safety device to the extent that the shear pin will continue to drive the wheel should nut 39 loosen slightly.

The compressor wheel 31 is fitted with suitable blades 43, and a shroud 44 is secured about the periphery thereof. The shroud 44 has an enlarged portion 45 which presents an axial surface 46, along which a labyrinth seal 47 extends. The seal 47 is retained against an inwardly disposed annular flange 48 on the housing 11, by means of a snap ring 49, engaging an annular groove 50, formed adjacent the inner end of a compressor intake passage 51 formed as an extension of the housing 11.

Compressed air discharged from the radial portion 52 of the compressor wheel, is adapted to be conducted through a radially extending annular space 53 and into a suitable scroll 54 to thereafter be conducted to a point for use. For example, the compressed air may be used as induction air for a reciprocating engine. A plurality of diffuser vanes 53a may be provided in the space 53 in order to assist in the recovery of the static pressure of the compressed air leaving the wheel 31.

The reduced diameter portion 23, of the shaft 20, has a flange 55 secured or formed on the end thereof to provide a mounting means for a radial inward flow or centripetal turbine rotor 56. A mounting ring and spacer 57 is positioned intermediate the flange 55 and the hub of the rotor 56, the rotor being secured in place by means of suitable bolts 58. The spacer ring 57 has radially extending grooves 57a to reduce the contact area between the ring and the rotor, thereby limiting heat transfer from the rotor to the shaft 20 and associated bearings.

To maintain concentric alignment between the rotor 56 and the shaft 20, a boss 59 is provided axially on the rearward end of the rotor, this boss being adapted to be positioned in a suitable bore 60, formed in the end of shaft 20. The turbine rotor 56 is provided with suitable blades 61, fluid driving means therefore being admitted through a variable area nozzle, indicated generally at 62, from a suitable scroll or torus 63. Motive power delivered to the torus 63 may be, for example, the exhaust gas from a reciprocating engine.

The torus 63 is secured to a flange 64, formed on the housing 11, by means of studs 65 and lock nuts 66. A shroud 67 is positioned about the periphery of the blades 61, said shroud having a radial extension 68 and an axial extension 69, the extension 69 being provided with suitable sealing rings 70 positioned in an annular groove 71. The rings 70 are adapted to engage and seal against an axially extending surface 72 formed on the radially inwardly directed portion of the scroll 63. For a purpose which will be later described, the rings 71 are adapted for axial slidable movement along the surface 72. A snap ring 73, secured in groove 74 formed in the surface 72, provides an inner limit or stop for a suitable exhaust stack (not shown) that may be inserted in the discharge duct. A passage, formed within an inner surface 75 of the extension 69, and a passage formed within the confines of the surface 72, form an exhaust passage for fluid discharged from the blades 61 of the turbine rotor 56.

A flexible mounting ring, indicated generally at 76, has a radially extending flange portion 77 which is secured in place by means of the studs 65 intermediate the attachment point for the scroll 63 and the flange 64. The mounting ring 76 has an axially extending, relatively thin ring portion 78 which terminates in a radially inwardly directed flange 79, the flange 79 being secured to the shroud extension 68 by means of spaced webs 80. In conjunction with the ring seals 70, the shroud 67 is therefore flexibly mounted by means of the relatively thin annular ring 78, to allow for thermal expansion of the shroud 67, and the surrounding components, without distortion of the unit as a whole.

A mounting arrangement for the variable area nozzle mechanism 62 is provided by means of an annular plate 81 which is secured to the flange 79 of the mounting ring 76 by means of studs 82 and lock nuts 83. The plate 81 is provided with a plurality of axially extending circumferentially spaced bosses 84, each boss being provided with an axial bore 85 and a circular recess 86.

As shown, primarily in Figs. 1, 3 and 4, the variable area nozzle 62 comprises a plurality of air-foil shape nozzle vanes 87 which are secured along their trailing edges to annular discs 88, as indicated at 89, Figs. 3 and 4, the trailing edges 90 of the vanes 87 terminating just short of the periphery of the disc 88. The vanes 87 are also spaced radially from the axis of the disc 88, as shown primarily in Figs. 3 and 4. Each of the discs 88 is provided with an axially extending shaft 91, the several shafts being adapted to be journaled in the bores 85 formed in the bosses 84. Each of the shafts 91 extends axially beyond the bosses 84 and is provided with a lever 92 secured thereto by means of serrations 93 and a snap ring 94. The levers 92 extend substantially radially outwardly from the shafts 91 and are provided with radially extending slots 95 in the outer ends thereof. The slots 95 are adapted to receive pins 96 which extend axially thereto from a nozzle actuating ring 97. (See also Fig. 2.)

Spaced rollers 98 are journaled on shafts 99, the shafts 99 being supported in the flange 64 adjacent the housing 11 and secured therein by means of snap rings 100. The rollers 98 are provided with a peripheral groove 101 which is adapted to be engaged by a radially inwardly directed annular rail 102 formed on the inner periphery of the actuating ring 97. The ring 97 is resiliently supported on the rollers 98 by means of a plurality of relatively thin, circumferentially extending portions 103, formed adjacent the rail 102 by means of a plurality of circumferentially extending cutouts 104, extending over the area of normal circumferential engagement of the rollers with the ring 97. Spaced circular cutouts 105 in the rail 102 permit assembly of the ring 97 over the rollers 98.

The ring 97 is adapted to be rotated about the rollers 98 by means of a lever 106, Figs. 1 and 2, which has an outward end 107 formed for engagement with a notch 108 in the inner periphery of the ring 97. The lever 106 is secured to a shaft 109 by means of serrations 110, the shaft 109 being journaled in a suitable bearing 111 carried by the flange 64, and a bearing 112 carried by a boss 113 which extends radially outwardly from an inwardly directed flange 114 of the housing 11. A lever 115 is secured to the outer end of the shaft 109 and is adapted to rotate the ring 97 about the rollers 98 through the medium of the lever 106 and notch 108. Rotation of the ring 97 will act through the pins 96 to move the levers 92 and thereby rotate the shafts 91 and the vanes 87.

Rotation of the vanes 87 will either increase or decrease the effective area of the nozzle 62 as defined by by spaces intermediate the vanes 87 and the opposed surfaces of the plate 81 and the shroud extension 68. The mounting arrangement for the vanes 87 permits opening and closing of the spaces defined therebetween with a minimum of travel of the trailing edges of these vanes, thereby permitting the establishment of the variable area nozzle mechanism in a relatively small radial space, contrary to the space requirements of the usual arrangement of vanes mounted for rotation on their own axes, and limiting the relative movement of the trailing edges away from their desirable position as close as possible to the entrance to the rotating turbine rotor 56.

In order to protect the components of the variable area nozzle actuating mechanism from exposure to high temperatures, shields 116 are positioned intermediate the flange 114 and the turbine rotor 56, and are secured to the flange 114 by means of screws 117. An additional shield 118 is interposed between the elements of the nozzle actuating mechanism and the torus 63 and secured intermediate the flange 77 of the mounting ring 76 and the flange 64, the studs 65 serving to hold the shield 118 in place.

Both the compressor wheel 31 and the turbine rotor 56 are provided with labyrinth seals 119 and 120. The labyrinth seal 119 is adapted to be secured in place by threads 121 formed on the inner periphery of the housing flange 12, the inner edges of the seal 119 being positioned in steps 122 formed on the outer periphery of the ring 32. The threads 121 permit axial adjustment of the seals relative to the steps 122, the steps 122 being arranged in descending relationship toward the wheel 31. The seal 120 is arranged in an axially extending cup 123 formed outwardly in the flange 114 and additionally held against rotation by means of a pin 124. The inner edges of the seal 120 are positioned in steps 125 formed on the spacer 57, these steps also being arranged to descend toward the turbine rotor 56.

One of the bearings 18 and 19 is shown in detail in Figs. 9 and 10, the bearing 19 being typical thereof. As shown, the bearing 19 comprises an axial portion 126 and outwardly directed flanges 127 on the axial ends thereof, these flanges being adapted to engage the portions 17 of the bearing carrier 14. A portion of the axial length of the inner surface 128 of the bearing 19 is provided with a plurality of circular grooves 129, these grooves being radially relatively short in depth at their deepest points and extending circumferentially about the shaft portion 23 to form circularly wedge-shape wall spaces intermediate the bearing portion 126 and the outer surface of the shaft 23, the said shaft being adapted to rotate counter clockwise therein, as shown by the arrow in Fig. 9. A lubricant is adapted to be delivered through a conduit 130, Fig. 1, into a longitudinal passage 131 formed in the bearing carrier 14, and into radial passages 132 and 133 to annular passages 134 and 135 formed about the central portion 126 of the bearing 19.

Referring again primarily to the typical bearing 19, the lubricant is conducted through a plurality of radially extending ports 136, each being formed in the portion 126 and extending into cylindrical reliefs 137 adjacent the inner end of the ports 136 and communicating with one end of the grooves 129. Lubricant entering the upstream end of the grooves 129 adjacent the ports 136, will be forced under pressure between the surfaces of normal running contact as at 138, intermediate the spaced grooves 129, the wiping action of the shaft 23 thus actually supporting the shaft 23 on a lubricant film. As shown in Fig. 10, the flanges 127 of the bearing 19 may be provided with radially extending notches 139 for the distribution of lubricant thereabout when such surfaces are used for thrust loading. Bearing 18 has thrust loading applied thereto from the enlarged central portion 21 of the shaft 20.

One of the problems encountered in variable area nozzles for turbosuperchargers used with reciprocating engines arises in the collection of contaminants from the exhaust gases passing through and about the many relatively moving or movable surfaces. To prevent such occurrences in the present device, a conduit 140, Fig. 1 is connected as at 141 to the passage 53 into which the compressed air is discharged from the compressor wheel. The conduit 140 is connected at 142 to the flange 64 to conduct high pressure air from the compressor into the chamber formed by the flange 64, the mounting ring 76, the plate 81 and the shield 116, thereby to create a pressure in this chamber in excess of the pressure normally existing at the entrance to the turbine blades 61. This high pressure air will be bled from the aforementioned chamber, as, for example, intermediate the shafts 91 and the bores 85 and into the area immediately downstream from the nozzle vanes and will scavenge contaminants that may normally tend to collect along the surfaces of rotation between these shafts and their associated bores.

In Figs. 5 and 6 a modification of the nozzle construction is shown wherein like parts are indicated by primed reference numerals. This embodiment of the invention includes a modified nozzle ring actuating mechanism having a ring 150 which is generally U-shaped in cross section. The ring 150 has a radially inwardly directed groove 151, a plurality of pins 152 being mounted in the ring 150 in transverse relationship to the groove 151. Levers 92' secured to the inner ends of the nozzle vane supporting shafts 91' are provided with slots 95' which are adapted to engage the pins 152. The ring 150 is guided by outwardly directed arcuate shoulders 153 formed on the levers 92'. The ring 150 has one pin 152a formed with an extension 154 which engages in a notch 155 formed in the outer end of a crank 156. The crank 156 is secured to the inner end of a shaft 109', the shaft 109' being adapted to be additionally secured to and to be rocked by means of a lever 115' to thus rotate the ring 150, the levers 92', shafts 91' and nozzle vanes 87'.

In Fig. 7 a modified form of mounting arrangement for the compressor rotor is shown, wherein like parts are again indicated by single primed reference numerals. In this modification, a mounting ring 32' is shown as being similar to the mounting ring 57 for the turbine rotor. In this instance, the flanges 27 and 28, as shown in Fig. 1, are combined into a single flange 160 and the mounting ring 32' is formed with a relatively thin radially inwardly directed portion 161. A compressor wheel 31' is secured on a shaft 26' by means of a washer 38' and a nut 39', which threadably engages the outer end 40' of the shaft 26'. An enlargement 29' of shaft 26' engages an axial bore 30' in the wheel hub and a second enlargement 162 is spaced therefrom and positioned adjacent the flange 160 for additional engagement with a bore 36'. A shear pin 41' extends from the flange 160, through the portion 161 of the mounting ring 32' and into an opening 42' in the compressor wheel 31'. The mounting ring 32' is provided with suitable steps 122' for association with the labyrinth seal 119 shown in Fig. 1.

In Fig. 8, a further modification of the compressor wheel mounting arrangement is shown, wherein like parts are indicated by double primed reference numerals. In this modification, a shaft 20", having a reduced diameter portion 22", is enlarged as at 170, a mounting ring portion 171 being formed integrally therewith, this portion being provided with suitable steps 122" for association with the labyrinth seal 119 shown in Fig. 1. The mounting ring portion 171 is adapted to engage an annular recessed face 33" on a wheel 31", a shear pin 41" extending from the mounting ring 171 and into an opening 42" formed in the wheel hub portion. The wheel hub is provided with an axial bore 36" that is enlarged as at 172. The shaft portion 22" is provided with an axial bore 173. A bolt 174 extends through the bores 172 and 173 and is provided with a threaded end portion 175 that is adapted to threadably engage threads 176 formed in the inner end of the bore 173. The bolt 174 has an enlargement 177, which is adapted to engage in the outer end of the bore 36", and an enlarged head 178 which is adapted to engage the outer face 179 of the wheel 31". Through the threads 175 and 176, the wheel 31" is retained in engagement with the mounting ring portion 171. A locking pin 180 is adapted to extend through the head 178 and into a bore 181 in the hub of the compressor wheel 31".

I claim:

1. An engine supercharging device comprising, in combination: a housing; a shaft rotatably supported within said housing; a compressor wheel; means for mounting said compressor wheel on one end of said shaft; a turbine rotor; means for mounting said turbine rotor on the other end of said shaft in spaced relationship to said compressor wheel; sealing means disposed about said shaft intermediate said compressor wheel and said turbine rotor; fluid entrance and discharge passage means operatively associated with the entrance to and discharge from said compressor wheel; means forming an annular passage at the entrance to said turbine rotor, said last mentioned means being substantially rigidly secured to said housing at one portion and relatively movably engaged with said housing at another portion; and actuating means for changing the effective area of said annular passage means, said actuating means being carried by and operable from outside said housing.

2. An engine supercharging device comprising, in combination: a housing; a shaft rotatably supported within said housing; a compressor wheel; means for mounting said compressor wheel on one end of said shaft; a turbine rotor; means for mounting said turbine rotor on the other end of said shaft in spaced relationship to said compressor wheel; sealing means disposed about said shaft intermediate said compressor wheel and said turbine rotor; fluid entrance and discharge passage means operatively associated with the entrance to and discharge from said compressor wheel; annular passage means operatively associated with said turbine rotor for receiving motive fluid; variable area nozzle means positioned intermediate said annular passage means and the entrance to said turbine rotor; means for flexibly mounting said nozzle means relative to said turbine rotor; actuating means for changing the area of said nozzle means, said actuating means being carried by and operable from outside said housing; and fluid means disposed in said housing for cleansing relatively moving surfaces of said nozzle actuating means.

3. An engine supercharging device comprising, in combination: a housing; a shaft rotatably supported within said housing; a radial outward flow compressor wheel; means for mounting said compressor wheel on one end of said shaft; a radial inward flow turbine rotor; means for mounting said turbine rotor on the other end of said shaft in spaced relationship to said compressor wheel; sealing means disposed about said shaft intermediate said compressor wheel and said turbine rotor; fluid entrance and discharge passage means operatively associated with the entrance to and discharge from said compressor wheel; annular passage means operatively associated with said turbine rotor for receiving motive fluid; variable area nozzle means positioned intermediate said annular passage means and the entrance to said turbine rotor; means for flexibly mounting said nozzle means relative to said turbine rotor; actuating means for changing the area of said nozzle means, said actuating means being carried by and operable from outside said housing; and fluid means carried by said housing for cleansing relatively moving surfaces of said nozzle actuating means.

4. An engine supercharging device comprising, in combination: a housing; a shaft rotatably supported within said housing; a compressor wheel; means for mounting said compressor wheel on one end of said shaft; a turbine rotor; means for mounting said turbine rotor on the other end of said shaft in spaced relationship to said compressor wheel; labyrinth sealing means disposed about said shaft adjacent said compressor wheel and said turbine rotor; fluid entrance and discharge passage means operatively associated with the entrance to and discharge from said compressor wheel; annular passage means operatively associated with said turbine rotor for receiving motive fluid; variable area nozzle means positioned intermediate said annular passage means and the entrance to said turbine rotor; means for flexibly mounting said nozzle means relative to said turbine rotor; actuating means for changing the area of said nozzle means, said actuating means being carried by and operable from outside said housing; and fluid cleansing means adapted to bleed compressed fluid from said compressor discharge to said nozzle actuating means for cleansing relatively moving surfaces thereof.

5. An engine supercharging device comprising, in combination: a housing; a shaft rotatably supported within said housing; a compressor wheel; wheel expansion compensating means for mounting said compressor wheel on one end of said shaft; a turbine rotor; means for mounting said turbine rotor on the other end of said shaft in spaced relationship to said compressor wheel; stepped labyrinth sealing means disposed about said shaft adjacent said compressor wheel and said turbine rotor; fluid entrance and discharge passage means operatively associated with the entrance to said compressor wheel; annular passage means associated with said turbine rotor for receiving motive fluid; variable area nozzle means positioned intermediate said annular passage means and the entrance to said turbine rotor; means for flexibly mounting said nozzle means relative to said turbine rotor; actuating means for changing the area of said nozzle means, said actuating means being carried by and operable from outside said housing; and fluid means carried by said housing for cleansing relatively moving surfaces of said nozzle actuating means.

6. An engine supercharging device comprising, in combination: a housing; a bearing carrier supported within said housing; bearings carried by said bearing carrier; a shaft rotatably supported by said bearings; a compressor wheel; means for mounting said compressor wheel on one end of said shaft; a turbine rotor; means for mounting said turbine rotor on the other end of said shaft in spaced relationship to said compressor wheel; sealing means disposed about said shaft intermediate the ends of said bearing carrier, said compressor wheel and said turbine rotor; fluid entrance and discharge passage means operatively associated with the entrance to and discharge from said compressor wheel; annular passage means operatively associated with said turbine rotor for receiving motive fluid; variable area nozzle means positioned intermediate said annular passage means and the entrance to said turbine rotor; means secured to said housing for flexibly mounting said nozzle means relative to said turbine rotor; actuating means for changing the area of said nozzle means, said actuating means being carried by and operable from outside said housing; and fluid means carried by said housing for cleansing relatively moving surfaces of said nozzle actuating means.

7. An engine supercharging device comprising, in combination: a housing; a shaft rotatably supported within said housing; a radial outward flow compressor wheel; a mounting ring for positioning said compressor wheel on one end of said shaft; a radial inward flow turbine rotor; another mounting ring for positioning said turbine rotor on the other end of said shaft in spaced relationship to said compressor wheel, said mounting rings having axially outwardly descending peripheral steps, labyrinth sealing means associated with said steps and disposed about said mounting rings adjacent said compressor wheel and said turbine rotor; fluid entrance and discharge passage means operatively associated with the entrance to and discharge from said compressor wheel; annular passage means operatively associated with said turbine rotor for receiving motive fluid; variable area nozzle means positioned intermediate said annular passage means and the entrance to said turbine rotor; means for flexibly mounting said nozzle means relative to said turbine rotor; and actuating means for changing the area of said nozzle means, said actuating means being carried by and operable from outside said housing.

8. An engine supercharging device comprising, in combination: a housing; a shaft rotatably supported within said housing; a compressor wheel; means for mounting said compressor wheel on one end of said shaft; a turbine rotor; means for mounting said turbine rotor on the other end of said shaft in spaced relationship to said compressor wheel; sealing means disposed about said shaft intermediate said compressor wheel and said turbine rotor; fluid entrance and discharge passage means operatively associated with the entrance to and discharge from said compressor wheel; annular passage means operatively associated with said turbine rotor for receiving motive fluid; discharge passage means for conducting fluid discharge from said turbine rotor; variable area nozzle means positioned intermediate said annular passage means and the entrance of said turbine rotor; means secured to said housing and axially slidable in said discharge passage means for flexibly mounting said nozzle means relative to said turbine rotor; and actuating means for changing the area of said nozzle means, said actuating means being carried by and operable from outside said housing.

9. An engine supercharging device comprising, in combination: a housing; a shaft rotatably supported within said housing; a compressor wheel; means for mounting said compressor wheel on one end of said shaft; a turbine rotor; means for mounting said turbine rotor on the other end of said shaft in spaced relationship to said compressor wheel; sealing means disposed about said shaft intermediate said compressor wheel and said turbine rotor; fluid entrance and discharge passage means operatively associated with the entrance to and discharge from said compressor wheel; annular passage means operatively associated with said turbine rotor for receiving motive fluid; axial discharge passage means for conducting fluid discharge from said turbine rotor; variable area nozzle means positioned intermediate said annular passage means and the entrance to said turbine rotor; means secured to said housing and axially slidable in said discharge passage means for flexibly mounting said nozzle means relative to said turbine rotor; sealing means associated with said flexible mounting means and said turbine rotor adjacent the respective axial discharge and annular passage means; actuating means for changing the area of said nozzle means, said actuating means being carried by and operable from outside said housing; and fluid means carried by said housing for cleansing relatively moving surfaces of said nozzle actuating means.

10. An engine supercharging device comprising, in combination: a housing; a shaft rotatably supported within said housing; a compressor wheel; means for mounting said compressor wheel on one end of said shaft; a turbine rotor; means for mounting said turbine rotor on the other end of said shaft in spaced relationship to said compressor wheel; sealing means disposed about said shaft intermediate said compressor wheel and said turbine rotor; fluid entrance and discharge passage means operatively associated with the entrance to and discharge from said compressor wheel; annular passage means operatively associated with said turbine rotor for receiving motive fluid; variable area nozzle vanes positioned intermediate said annular passage means and the entrance to said turbine rotor; means for flexibly mounting said nozzle vanes relative to said turbine rotor, actuating means including an annular ring having an attachment associated with each of said vanes for changing the area intermediate said nozzle vanes, said actuating means being carried by and operable from outside said housing; and fluid means carried by said housing for cleansing relatively moving surfaces of said nozzle actuating means.

11. An engine supercharging device comprising, in combination: a split housing; a split bearing carrier supported within said housing; bearings carried by said bearing carrier; a shaft rotatably supported within said bearings, said shaft having an enlarged central portion and reduced diameter bearing engagement surfaces; means for supplying a lubricant to said bearings; a radial outward flow compressor wheel; wheel expansion compensating means for mounting said compressor wheel on one end of said shaft; an inward flow turbine rotor; means for mounting said turbine rotor on the other end of said shaft in spaced relationship to said compressor wheel; labyrinth sealing means disposed about said shaft adjacent the ends of said bearing carrier, said compressor wheel and said turbine rotor; fluid entrance and discharge passage means operatively associated with the entrance to and discharge from said compressor wheel; toroidal passage means operatively associated with said turbine wheel for receiving motive fluid; variable area nozzle means positioned intermediate said toroidal passage means and the entrance to said turbine rotor; means secured to said housing for flexibly mounting said nozzle means relative to said turbine rotor; actuating means for changing the area of said nozzle means; said actuating means being carried by and operable from outside said housing; and fluid means carried by said housing for cleansing relatively moving surfaces of said nozzle actuating means.

12. An engine supercharging device comprising, in combination: a housing; a shaft rotatably supported within said housing; a compressor wheel; a mounting ring for positioning said compressor wheel on one end of said shaft; a turbine rotor; another mounting ring for positioning said turbine rotor on the other end of said shaft in spaced relationship to said compressor wheel, said mounting rings having axially outwardly descending peripheral steps; stepped labyrinth sealing means operatively associated with said steps and disposed about said mounting rings adjacent said compressor wheel and said turbine rotor; fluid entrance and discharge passage means operatively associated with the entrance to and discharge from said compressor wheel; toroidal passage means operatively associated with said turbine rotor for receiving motive fluid; discharge passage means for conducting fluid discharge from said turbine rotor; variable area nozzle means positioned intermediate said toroidal passage means and the entrance to said turbine rotor; means secured to said housing and axially slidable in said discharge passage means for flexibly mounting said nozzle means relative to said turbine rotor; actuating means for changing the area of said nozzle means, said actuating means being carried by and operable from outside said housing; and fluid means carried by said housing for cleansing relatively moving surfaces of said nozzle actuating means.

13. An engine supercharging device comprising, in combination: a housing; a shaft rotatably supported within said housing; radial outward flow compressor wheel; means for mounting said compressor wheel on one end of said shaft; a radial inward flow turbine rotor; means for mounting said turbine rotor on the other end of said shaft in spaced relationship to said compressor wheel; sealing means disposed about said shaft intermediate said compressor wheel and said turbine rotor; axially disposed fluid entrance passage means and scroll discharge passage means operatively associated with the entrance to and discharge from said compressor wheel; toroidal passage means operatively associated with said turbine rotor for receiving motive fluid; axially disposed discharge passage means for said turbine rotor; variable area nozzle vanes positioned intermediate said toroidal passage means and the entrance to said turbine rotor; means secured to said housing and axially slidable in said discharge passage means for flexibly mounting said nozzle vanes relative to said turbine rotor; sealing means operatively associated with said flexible mounting means and said turbine rotor adjacent the respective axial discharge and annular passage means; actuating means for changing the effective area intermediate said nozzle vanes, said actuating means being carried by and operable from outside said housing; and fluid cleansing means adapted to bleed compressed fluid from said compressor discharge to said nozzle actuating means for cleansing relatively moving surfaces thereof.

14. An engine supercharging device comprising, in combination: a split housing; a split bearing carrier supported within said housing; lubricant distributing bearings carried by said bearing carrier; a shaft rotatably supported within said bearings, said shaft having an enlarged central portion and reduced diameter bearing engagement surfaces; means for supplying a lubricant to said bearings; a radial outward flow compressor wheel; wheel expansion compensating means for mounting said compressor wheel on one end of said shaft; an inward flow turbine rotor; means for mounting said turbine rotor on the other end of said shaft in spaced relationship to said compressor wheel; labyrinth sealing means disposed about said shaft adjacent the ends of said bearing carrier, said compressor wheel and said turbine rotor; fluid entrance and discharge passage means operatively associated with the entrance to and discharge from said compressor wheel; toroidal passage means operatively associated with said turbine rotor for receiving motive fluid; axially disposed discharge passage means for conducting fluid discharge from said turbine rotor; variable area nozzle means positioned intermediate said toroidal passage means and the entrance to said turbine rotor; means secured to said housing and axially slidable in said discharge passage means for flexibly mounting said nozzle means relative to said turbine rotor; sealing means operatively associated with said flexible mounting means and said turbine rotor adjacent the respective axial discharge and annular passage means; actuating means for changing the area of said nozzle means, said actuating means being carried by and operable from outside said housing; and fluid means carried by said housing for cleansing relatively moving surfaces of said nozzle actuating means.

15. An engine supercharging device comprising, in combination: a split housing; a split bearing carrier supported within said housing; lubricant distributing bearings carried by said bearing carrier; a shaft rotatably supported within said bearings, said shaft having an enlarged central portion and reduced diameter bearing engagement surfaces; means to supply a lubricant to said bearings; a radial outward flow compressor wheel; wheel expansion compensating means for mounting said compresser wheel on one end of said shaft; an inward flow turbine rotor; means for mounting said turbine rotor on the other end of said shaft in spaced relationship to said compressor wheel; labyrinth sealing means disposed about said shaft adjacent the ends of said bearing carrier, said compressor wheel and said turbine rotor; axially disposed fluid entrance passage means and discharge scroll passage means operatively associated with the entrance to and discharge from said compressor wheel; toroidal passage means operatively associated with said turbine rotor for receiving motive fluid; axially disposed discharge passage means for said turbine rotor; variable area nozzle means positioned intermediate said toroidal passage means and the entrance to said turbine rotor; means secured to said housing and axially slidable in said discharge passage means for flexibly mounting said nozzle means relative to said turbine rotor; sealing means operatively associated with said flexible mounting means and said turbine rotor adjacent the respective axially disposed discharge and toroidal passage means; actuating means for changing the area of said nozzle means, said actuating means being carried by and operable from outside said housing; and fluid cleansing means adapted to bleed compressed fluid from said compressor discharge to said nozzle actuating means for cleansing relatively moving surfaces thereof.

16. An engine supercharging device comprising, in combination: a split housing; a split bearing carrier supported within said housing; lubricant distributing bearings carried by said bearing carrier; a shaft rotatably supported within said bearings; said shaft having an enlarged central portion and reduced diameter bearing engagement surfaces; means for supplying a lubricant to said bearings; a radial outward flow compressor wheel; a mounting ring arranged on said shaft for positioning said compressor wheel on one end thereof; an inward flow turbine rotor; another mounting ring arranged on said shaft for positioning said turbine rotor on the other end thereof in spaced relationship to said compressor wheel, said mounting rings having axially outwardly descending peripheral steps; stepped labyrinth sealing means operatively associated with said steps and disposed about said mounting rings adjacent the ends of said bearing carrier, said compressor wheel and said turbine rotor; axially disposed fluid entrance passage means and discharge scroll passage means operatively associated with the entrance to and discharge from said compressor wheel; toroidal passage means operatively associated with said turbine rotor for receiving motive fluid; axially disposed discharge passage means from said turbine rotor; variable area nozzle vanes positioned intermediate said toroidal passage means and the entrance to said turbine rotor; means secured to said housing and axially slidable in said discharge passage means for flexibly mounting said nozzle vanes relative to said turbine rotor; sealing means associated with said flexible mounting means and said turbine rotor adjacent the respective axially disposed discharge and toroidal passage means; actuating means for changing the area intermediate said nozzle vanes, said actuating means being carried by and operable from outside said housing; and fluid cleansing means adapted to bleed compressed fluid from said compressor discharge to said nozzle actuating means for cleansing relatively moving surfaces thereof.

17. An engine supercharging device comprising, in combination: a split housing; a split bearing carrier supported within said housing; bearings carried by said bearing carrier; a shaft rotatably supported within said bearings, said shaft having an enlarged central portion, one of the axial ends thereof being adapted to engage said bearing for thrust loading, and having reduced diameter rotary bearing engagement surfaces; means for supplying a lubricant to said bearing; a radial outward flow compressor wheel; a mounting ring arranged on said shaft for positioning said compressor wheel on one end thereof; an inward flow turbine rotor; another mounting ring arranged on said shaft for positioning said turbine rotor on the other end thereof in spaced relationship to said compressor wheel, said mounting rings having axially outwardly descending peripheral steps; stepped labyrinth sealing means operatively associated with said steps and disposed about said mounting rings adjacent the ends of said bearing carrier, said compressor wheel and said turbine rotor; axially disposed fluid entrance passage means and discharge scroll passage means operatively associated with the entrance to and discharge from said compressor wheel; toroidal passage means operatively associated with said turbine rotor for receiving motive fluid; axially disposed discharge passage means from said turbine rotor; variable area nozzle vanes positioned intermediate said toroidal passage means and the entrance to said turbine rotor; means secured to said housing and axially slidable in said discharge passage means for flexibly mounting said nozzle vanes relative to said turbine rotor; sealing means associated with said flexible mounting means and said turbine rotor adjacent the respective axially disposed discharge and toroidal passage means; actuating means for changing the area intermediate said nozzle vanes, said actuating means being carried by and operable from outside said housing; and fluid cleansing means adapted to bleed compressed fluid flow from said compressor discharge to said nozzle actuating means for cleansing relatively moving surfaces thereof.

18. An engine supercharging device comprising, in combination: a split housing; a split bearing carrier supported within said housing; lubricant distributing bearings carried by said bearing carrier; a shaft rotatably supported within said bearings, said shaft having an enlarged central portion, one of the axial ends thereof being adapted to engage said bearings for thrust loading, and having reduced diameter rotary bearing engagement surfaces; means for supplying a lubricant to said bearings; a radial outward flow compressor wheel; a mounting ring arranged on said shaft for positioning said compressor wheel on one end thereof; expansion compensation means associated with said compressor wheel mounting; an inward flow turbine rotor; another mounting ring arranged on said shaft for positioning said turbine rotor on the other end thereof in spaced relationship to said compressor wheel, said mounting rings having axially outwardly descending peripheral steps; stepped labyrinth sealing means operatively associated with said steps and disposed about said mounting rings adjacent the ends of said bearing carrier, said compressor wheel and said turbine rotor; axially disposed fluid entrance passage means and discharge scroll passage means operatively associated with the entrance to and discharge from said compressor wheel; toroidal passage means operatively associated with said turbine rotor for receiving motive fluid; axially disposed discharge passage means for said turbine rotor; variable area nozzle vanes positioned intermediate said toroidal passage means and the entrance to said turbine rotor; means secured to said housing, forming a shroud for said turbine rotor and axially slidable in said discharge passage means for flexibly mounting said nozzle vanes relative to said turbine rotor; sealing means operatively associated with said flexible mounting means and said turbine rotor adjacent the respective axially disposed discharge scroll and toroidal passage means; actuating means for changing the area intermediate said nozzle vanes, said actuating means being carried by and operable from outside said housing; and fluid cleansing means adapted to bleed compressed fluid flow from said compressor discharge to said nozzle actuating means for cleansing relatively moving surfaces thereof.

19. In an engine supercharging device having a housing, an exhaust-driven turbine rotor, and a compressor driven by said turbine rotor: entrance passage means for receiving exhaust from said engine; variable area nozzle means positioned intermediate said passage means and said turbine rotor; flexible mounting means for said nozzle means, said flexible mounting means being substantially rigidly secured at one portion to said housing and relatively movably engaged therewith at another portion; and actuating means for changing the area of said discharge nozzle means, said actuating means being operable from outside said housing.

20. In an engine supercharging device having a housing, an exhaust-driven turbine rotor, and a compressor driven by said turbine rotor; toroidal entrance passage means for receiving exhaust from said engine; variable area nozzle means positioned intermediate said passage means and said turbine rotor; flexible mounting means for said nozzle means, said flexible mounting means being substantially stationarily supported at one portion and relatively movably supported at another portion in said housing, a portion of said flexible mounting means forming a shroud for said turbine rotor; and actuating means for changing the area of said discharge nozzle means, said actuating means being operable from outside said housing and comprising a rotatably mounted actuating ring operably connected to said nozzle means for actuation thereof.

21. In an engine supercharging device having a housing, an exhaust-driven turbine rotor, and a compressor driven by said turbine rotor: toroidal entrance passage means for receiving exhaust from said engine; variable area nozzle vanes positioned intermediate said passage means and said turbine rotor; means for flexibly mounting said nozzle vanes, said mounting means being substantially stationarily supported at one portion and relatively movably supported at another portion in said housing, a portion of said mounting means forming a shroud for said turbine rotor; actuating means for changing the area intermediate said discharge nozzle vanes, said actuating means being arranged for operation from outside said housing; a rotatably mounted actuating ring; a plurality of rollers mounted on said housing for supporting said actuating ring; resilient means formed in said ring adjacent said supporting rollers for maintaining substantially constant pressure on said rollers; and lever means interconnecting said actuating ring and said nozzle vanes.

22. A variable area nozzle mechanism for use in connection with a turbine rotor and adapted to be positioned intermediate a turbine rotor entrance passage and said turbine wheel, comprising: a plurality of rotatable shafts; nozzle vanes mounted eccentrically of the axes of said shafts for rotary adjustment thereby; turbine rotor shroud means having an extension operatively associated with said vanes; a housing; a plurality of rollers mounted for rotation in said housing; an actuating ring rotatably mounted on said rollers; lever means interconnecting said actuating ring and said nozzle vanes for rotatably positioning said vanes; means operable from outside said housing for rotating said actuating ring; and means flexibly supporting said vanes, said supporting means being substantially stationarily supported at one portion and relatively movably supported at another portion in said housing.

23. A variable area nozzle mechanism for use in connection with a turbine rotor and adapted to be positioned intermediate a toroidal turbine rotor entrance passage and said turbine rotor, comprising: a plurality of rotatable shafts; nozzle vanes mounted eccentrically of the axes of said shafts for rotary adjustment thereby; turbine rotor shroud means having an extension operatively associated with said vanes; a housing; a plurality of rollers mounted for rotation in said housing; an actuating ring rotatably mounted on said rollers; annular openings formed in said ring adjacent the portion thereof engaging said rollers for providing resilient means to maintain substantially constant pressure on said rollers; lever means interconnecting said actuating ring and said nozzle vanes for positioning said vanes; means operable from outside said housing for rotating said actuating ring; and means flexibly supporting said vanes, said supporting means being substantially stationarily supported at one portion and relatively movably supported at another portion in said housing.

24. A mounting mechanism for a turbine rotor associated nozzle ring, comprising: a turbine rotor; a housing for said turbine rotor; discharge passage means for said turbine rotor and operatively associated with said housing; shroud means for said turbine rotor, said shroud means being slidable in said discharge passage means; and an axially extending flexible supporting ring secured at one edge to said shroud means and at the opposite edge to said housing, said nozzle ring being positioned in operative association with said shroud means and said flexible supporting ring.

25. A mounting mechanism for a turbine rotor associated variable nozzle, comprising: a turbine rotor; a housing for said turbine rotor; discharge passage means for said turbine rotor and operatively associated with said housing; shroud means for said turbine rotor, said shroud means being slidable in said discharge passage means, and having a radially extending extension; an axially extending relatively thin flexible supporting ring secured at one edge to said extension and at the opposite edge to said housing; and a nozzle retaining member secured to said supporting ring, said nozzle being positioned intermediate said nozzle retaining member and said extension of said shroud means.

26. In a gas turbine of the type having a housing, a rotor journaled in said housing and a passage in said housing for receiving a driving fluid; variable area nozzle means communicating with said passage and said rotor for directing operating fluid from the passage to the rotor, said nozzle means having a plurality of vanes; and means supporting said vanes with the trailing edges thereof adjacent the periphery of the rotor, said means being adjustable to move the leading edges of said vanes toward and away from said rotor without substantially changing the distance between the rotor and the trailing edges of said vanes.

27. In a gas turbine of the type having a housing, a rotor journaled in said housing and a passage in said housing for receiving a driving fluid; variable area nozzle means communicating with said passage and said rotor for directing operating fluid from the passage to the rotor, said nozzle means having a plurality of vanes; means supporting said vanes with the trailing edges thereof adjacent the periphery of the rotor, said means being adjustable to move the leading edges of said vanes toward and away from said rotor while substantially maintaining the distance between the rotor and the trailing edges of said vanes; and operating means disposed exteriorly of said housing and having a motion transmitting connection with said vane supporting means.

28. In a gas turbine of the type having a housing, a rotor journaled in said housing and a passage formed by said housing for receiving a driving fluid; variable area nozzle means for directing driving fluid from said passage to said rotor, said nozzle means having a pair of spaced walls; a plurality of vanes disposed between said walls; means supporting said vanes with the trailing edges thereof adjacent the periphery of said rotor, said means being adjustable to move the leading edges of said vanes toward and away from said rotor while substantially maintaining the distance between the rotor and the trailing edges of said vanes; means supporting said spaced walls and vanes for movement relative to said housing in response to expansion and contraction due to temperature changes; operating means for said vanes disposed exteriorly of said housing; and motion transmitting means connecting said operating means and said vane supporting means, said motion transmitting connection being maintained during movement of said spaced walls and vanes relative to said housing.

References Cited in the file of this patent

UNITED STATES PATENTS

| | | |
|---|---|---|
| 1,953,297 | Good | Apr. 3, 1934 |
| 2,351,356 | Mayer | Jan. 13, 1944 |
| 2,392,858 | McMahan | Jan. 15, 1946 |
| 2,428,830 | Birmann | Oct. 14, 1947 |
| 2,484,275 | Eastman | Oct. 11, 1949 |
| 2,577,134 | Land | Dec. 4, 1951 |
| 2,622,789 | Lundquist | Dec. 23, 1952 |
| 2,646,210 | Kohlmann et al. | July 21, 1953 |
| 2,709,567 | Wood | May 31, 1955 |
| 2,715,814 | Barr | Aug. 23, 1955 |